United States Patent [19]
Yamashita et al.

[11] Patent Number: 5,640,467
[45] Date of Patent: Jun. 17, 1997

[54] IMAGE FORMING APPARATUS WHICH MONITORS HARDWARE ERRORS OF A CONTROLLER OF A COPYING-INHIBITED FUNCTION

[75] Inventors: Toshiki Yamashita, Machida; Tsuyoshi Endo, Kawasaki, both of Japan

[73] Assignee: Ricoh Company, Ltd., Tokyo, Japan

[21] Appl. No.: 412,113

[22] Filed: Mar. 28, 1995

[30]   Foreign Application Priority Data

Mar. 30, 1994  [JP]  Japan .................................. 6-085658

[51] Int. Cl.$^6$ .............................. G06K 9/00; G03G 21/00
[52] U.S. Cl. ............................ 382/181; 382/309; 399/9; 399/366
[58] Field of Search ......................... 382/135, 137–140, 382/165, 218, 309–311, 181; 355/201; 283/902; 356/71; 364/265.6, 266.4, 944.6, 944.91; 395/180

[56]   References Cited

U.S. PATENT DOCUMENTS

| | | | |
|---|---|---|---|
| 5,027,288 | 6/1991 | Suzuki et al. | 364/519 |
| 5,309,245 | 5/1994 | Hayashi et al. | 358/296 |
| 5,390,003 | 2/1995 | Yamaguchi et al. | 355/201 |
| 5,424,807 | 6/1995 | Ohmura | 355/201 |
| 5,426,710 | 6/1995 | Suzuki et al. | 382/135 |

FOREIGN PATENT DOCUMENTS 4-54681  2/1992  Japan .

*Primary Examiner*—Leo Boudreau
*Assistant Examiner*—Bhavesh Mehta
*Attorney, Agent, or Firm*—Oblon, Spivak, McClelland, Maier & Neustadt, P.C.

[57]   ABSTRACT

A controller accurately discriminates a copying-inhibited document prepared by using paper on which a copying-inhibited pattern is printed or copied on the entire surface, executes the copying inhibition control, detects a hardware error, and executes the copying inhibition control upon detection of the hardware error by recognizing a copied document as a copying-inhibited document and executing copying inhibition control when a copying-inhibited document detected signal is inputted during an operation for reading a copied document from the copying-inhibited document discriminator, and also by determining that a hard error has occurred in the copying inhibition discriminating board, giving a warning through an operation displaying unit, and executing a copying inhibition control when a copying-inhibited document signal or a copying-inhibited document not-detected signal is inputted during a period other than that for reading a copied document.

11 Claims, 17 Drawing Sheets

FIG. 4

| A | B | C |
|---|---|---|
| D | E | F |
| G | H | I |

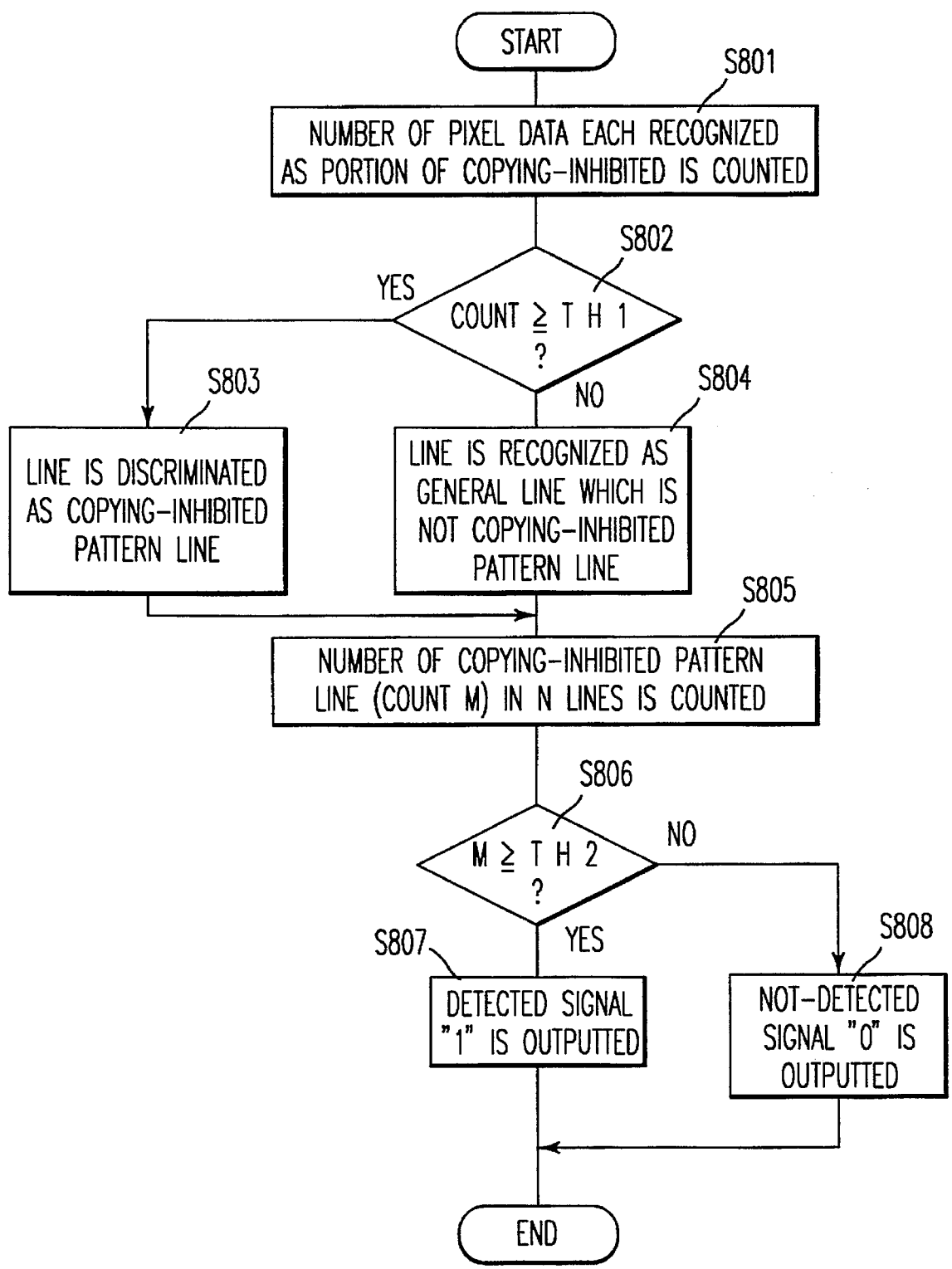

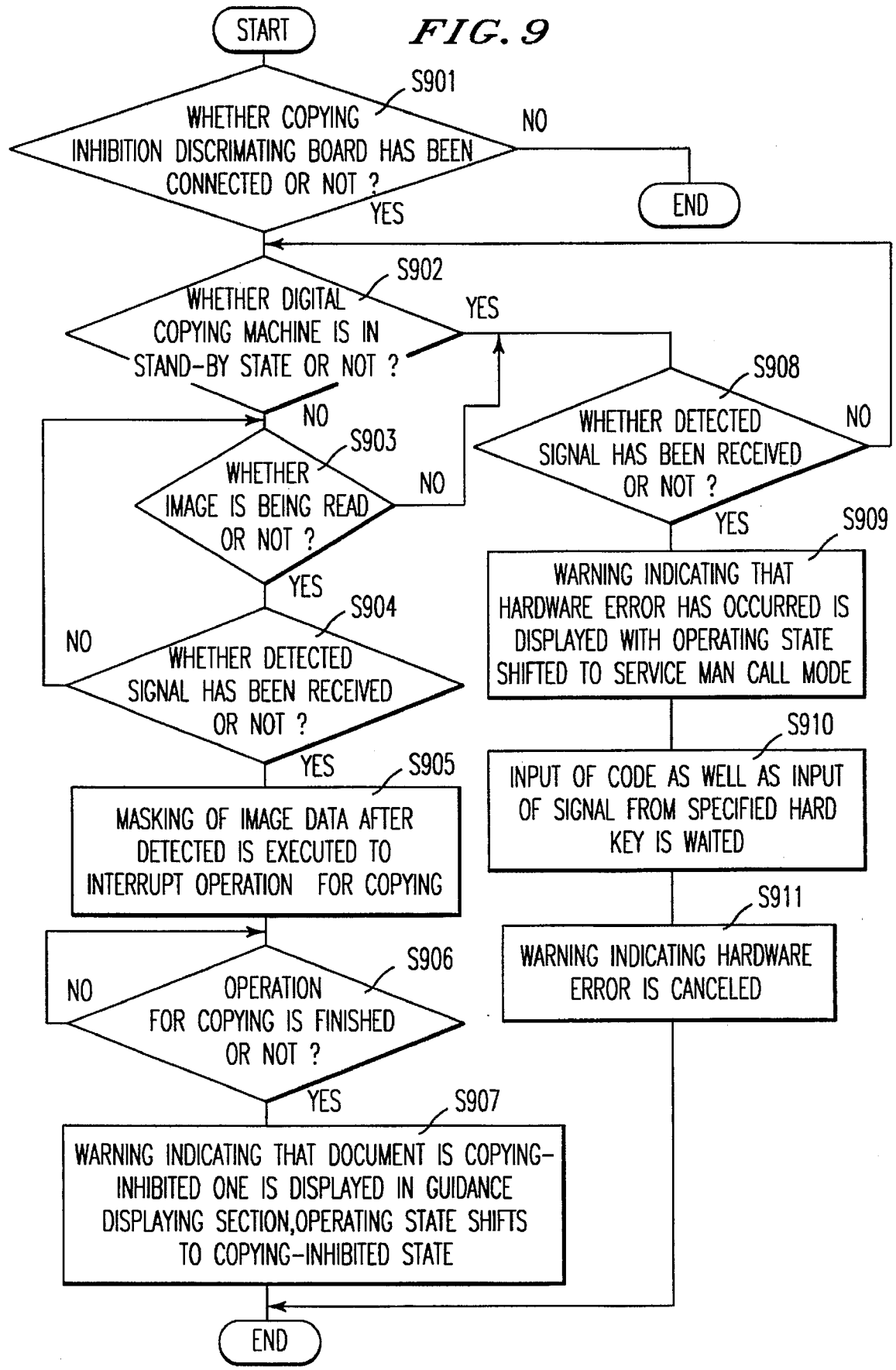

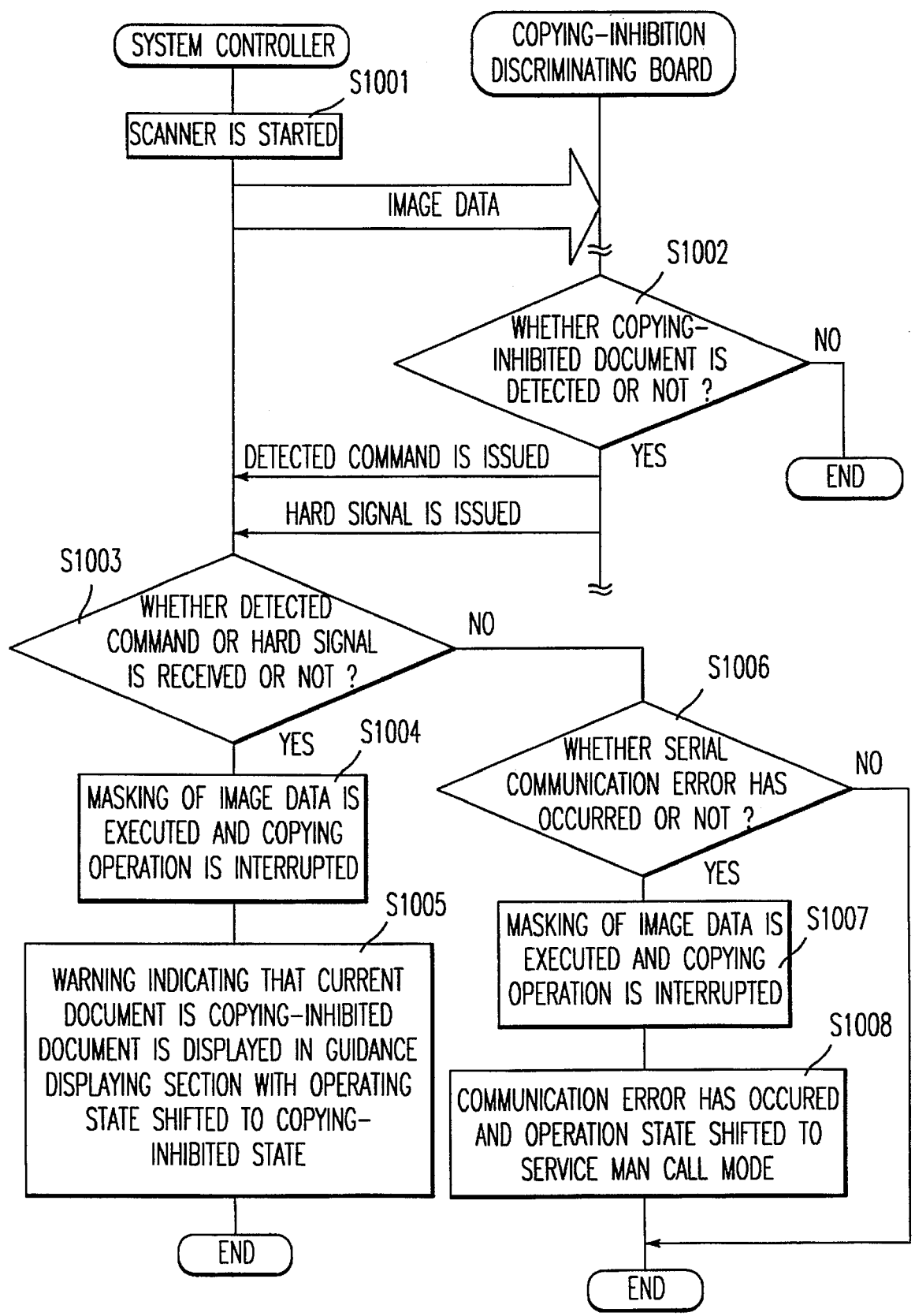

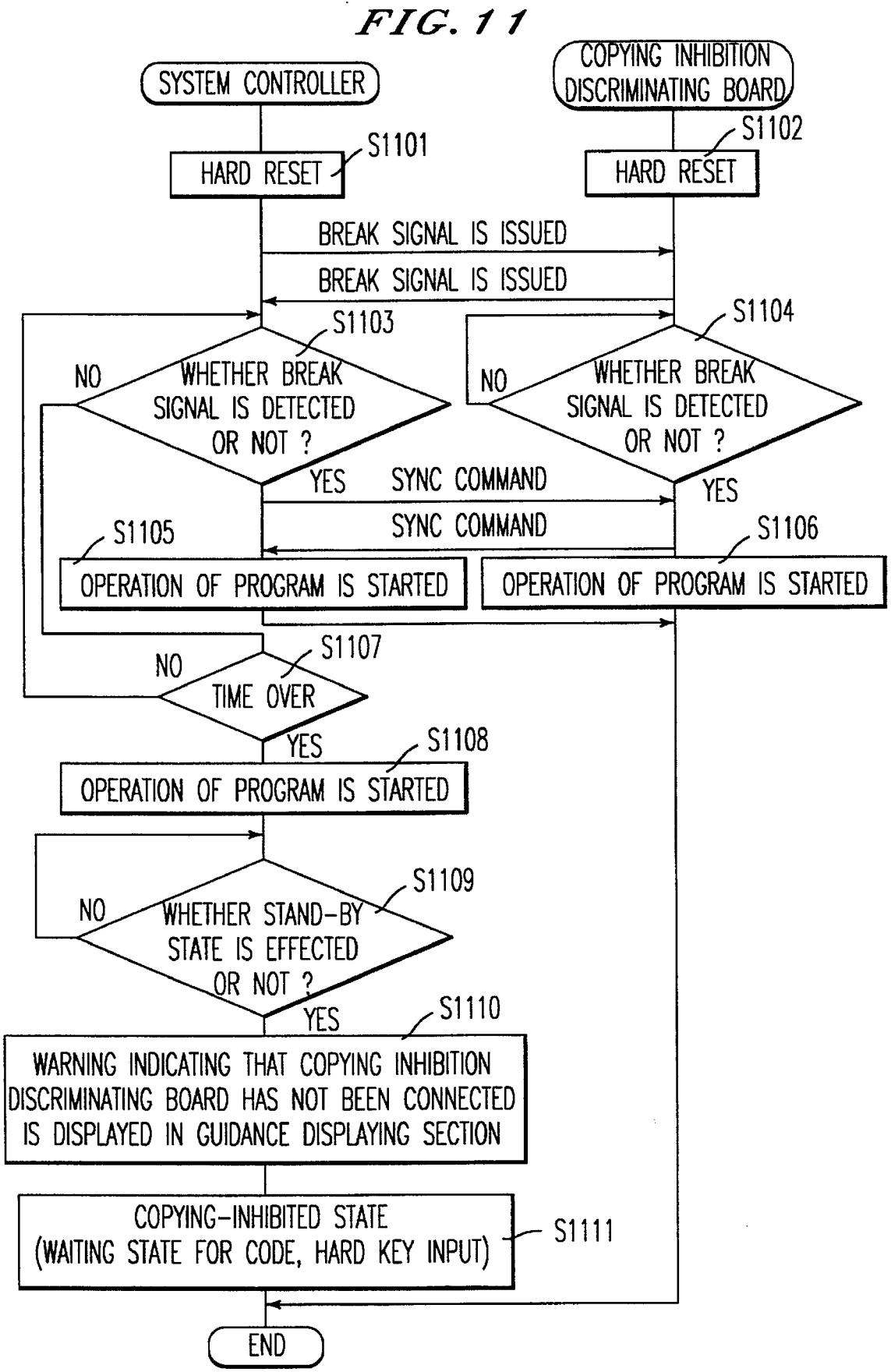

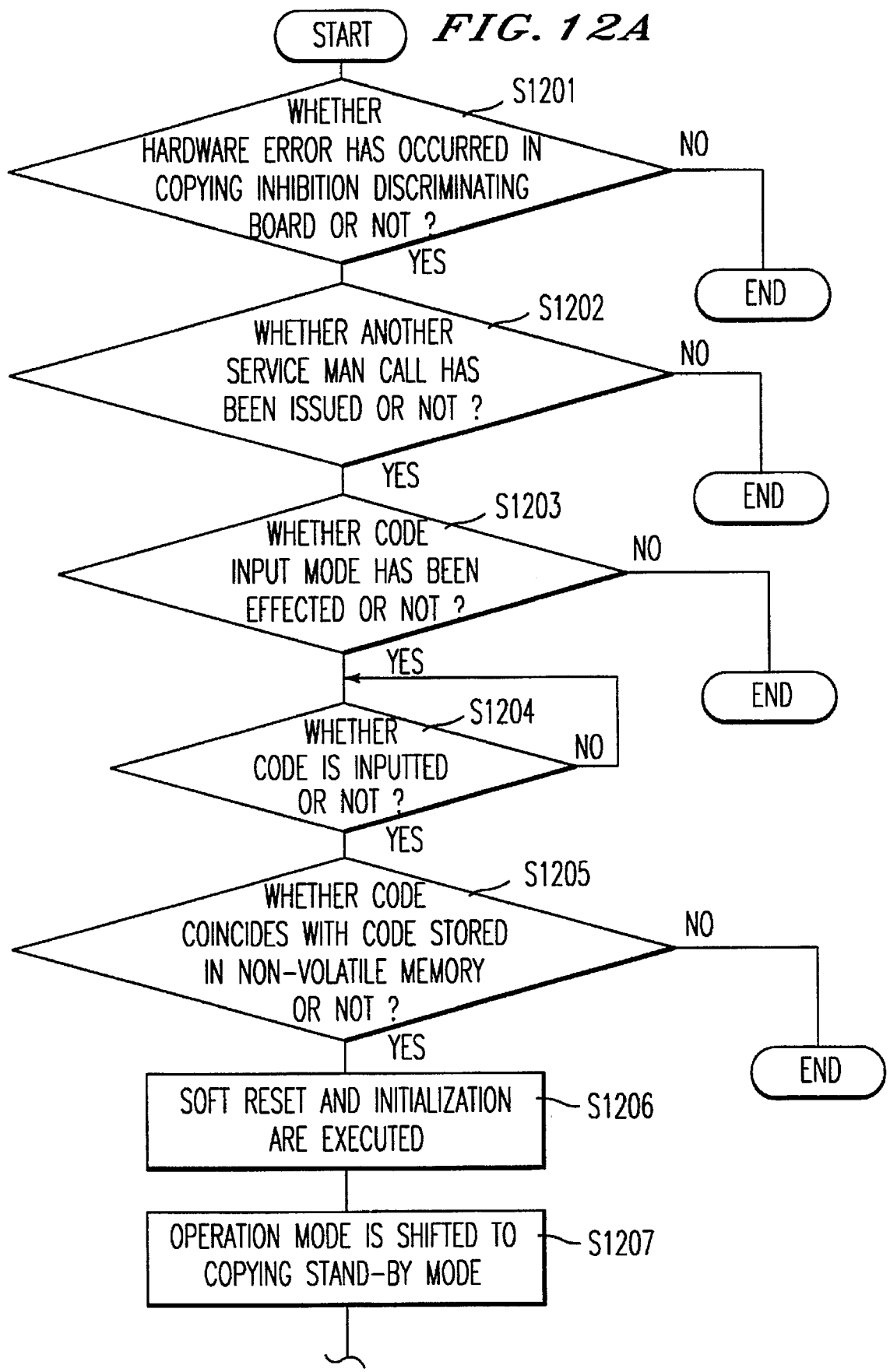

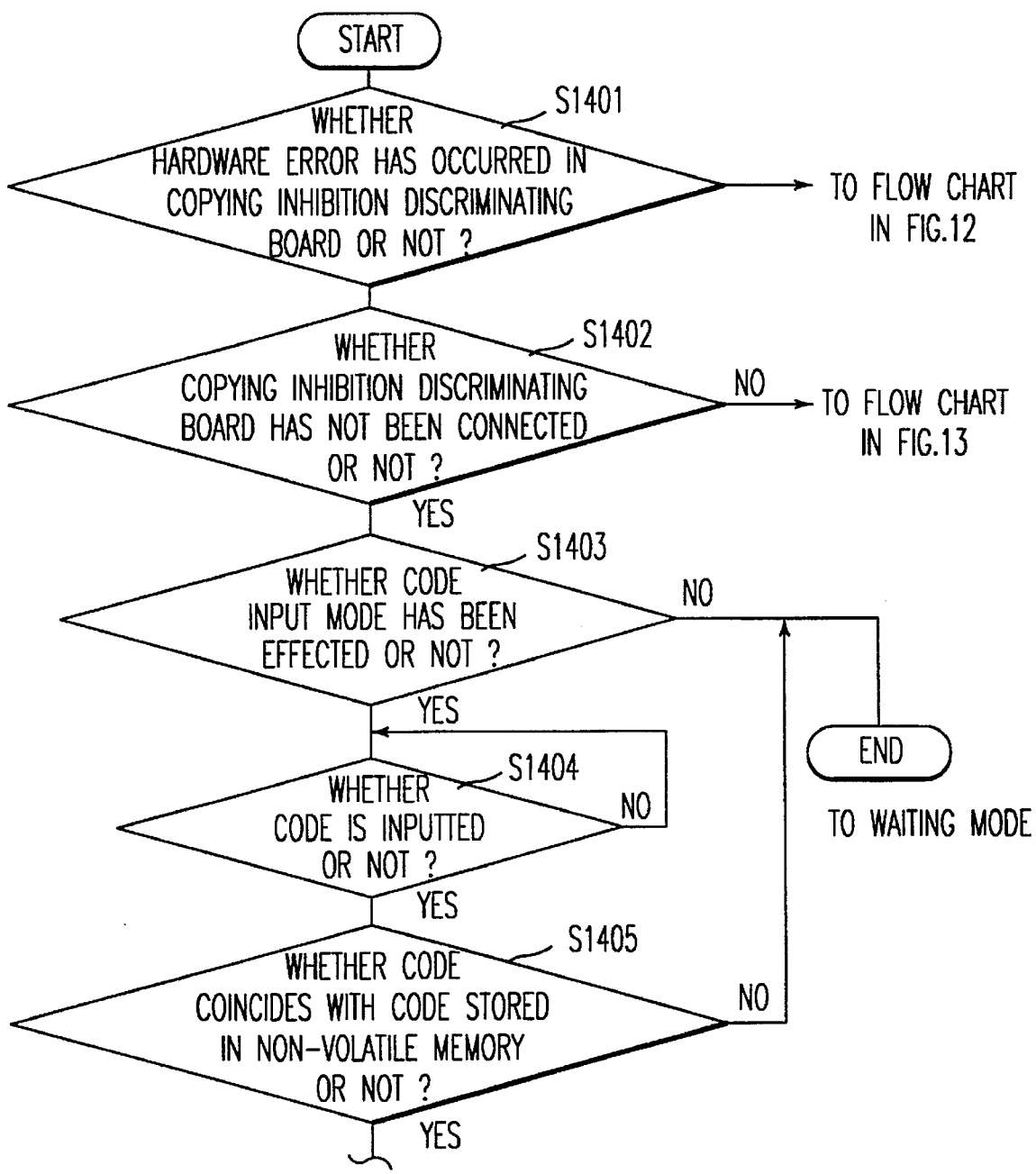

IMAGE FORMING APPARATUS WHICH MONITORS HARDWARE ERRORS OF A CONTROLLER OF A COPYING-INHIBITED FUNCTION

FIELD OF THE INVENTION

The present invention relates to an image forming apparatus used in a digital copying machine, a facsimile device, a scanner, an image filing device or the like, and more particularly to an image forming apparatus having a function to prevent a document inhibited to be copied from being copied illegally.

BACKGROUND OF THE INVENTION

In recent years, in association with improvement in the field of image forming technology, in some cases a copied bill prepared by a digital color copying machine can not easily be discriminated from an actual bill. For this reason, a digital color copying machine, which can discriminate specific documents such as marketable securities or bills inhibited to be copied and prevent the specific documents from being copied illegally, has been put into actual use.

As a method of discriminating specific documents such as bills or marketable securities, there has been proposed, for instance, a method in which an inputted image data is compared to a special marking (pattern data) previously registered by means of the pattern matching method and a document is recognized as a specific document when the special marking is present in the inputted image data, or a method disclosed in Japanese Patent Laid Open Publication No. 54681/1992 in which a specific document is discriminated by comparing a form of a histogram based on color phase distribution to a standard one.

In company offices or the like, there exist various types of general documents, other than the specific document such as bills or marketable securities as described above, inhibited to be copied because of the importance of contents thereof or for security (described a copying-inhibited document hereinafter). Generally, this type of copying-inhibited document has a stamp indicating security or a marking indicating inhibition of copying thereon, which makes it possible for the document to be discriminated from other documents which may be copied.

In the methods as described above, however, a stamp indicating security or a marking indicating inhibition of copying is put on a copying-inhibited document to alert users that the document is inhibited to be copied, and in these cases inhibition of copying the document is preserved only when the users follow the rule, and copying is not physically inhibited, so that the users can copy the document by using, for instance, a copying machine, send the document by means of facsimile transmission using a facsimile device, or input an image of the document into an image filing device for storage.

It is conceivable that a device for inhibiting a copying-inhibited document to be copied is built by applying the conventional type of methods for discriminating specific documents to discrimination of copying-inhibited documents, but in a case where copying of a copying-inhibited document is inhibited by discriminating a stamp indicating security or a marking indicating inhibition of copying, for instance, by means of pattern matching method, if the stamp indicating security or marking indicating inhibition of copying is hid with paper or the like, discrimination can not be carried out, and it is impossible to make users preserve inhibition of copying a copying-inhibited document.

Also in a case where discrimination carried out by comparing a form of histogram based on color phase distribution to a standard one, there are problems that the method can not be applied to a device which treats image data as binary data for white and black, and that, as there are various types of copying-inhibited document and there is not always a common feature among the forms of histogram each based on color phase distribution, discrimination of a copying-inhibited document itself can not be carried out accurately.

Also the methods as described above assume that a mechanism (such as a board) for discriminating image data is always working when image read is executed, and if an error is generated in this mechanism, all the operations for copying must be inhibited, and a copying operation can not be executed until the error is removed, which disadvantageously gives damages or causes troubles in users' job or the like. This is especially fatal to users who must make many sheets of various documents or copy documents frequently.

SUMMARY OF THE INVENTION

It is an object of the present invention to inhibit for image data of copying-inhibited document to be copied, transferred, stored or inputted without fail by means of accurately discriminating the copying-inhibited documents.

Also it is an object of the present invention to make it possible to execute a normal copying operation even if an error is generated in a mechanism for discriminating image data.

In an image forming apparatus according to the present invention, a detection is made by a copying-inhibition discriminating board with a copying-inhibited pattern detector and a copying-inhibited document discriminator as to whether each individual pixel data constituting image data is a portion of a copying-inhibited pattern previously specified or not, a determination is made according to a number of pixel data each detected as a portion of a copying-inhibited pattern as to whether the image data is that for a copying-inhibited document or not, and a copying-inhibited document detected signal or a copying-inhibited document not-detected signal is outputted. On the other hand, controller accurately discriminates a copying-inhibited document prepared by using paper on which a copying-inhibited patter is printed or copied on the entire surface, executes the copying inhibition control, detects a hardware error, and executes the copying inhibition control upon detection of the hardware error by recognizing a copied document as a copying-inhibited document and executing copying inhibition control when a copying-inhibited document detected signal is inputted during an operation for reading a copied document from the copying-inhibited document discriminator, and also by determining that a hard error has occurred in the copying inhibition discriminating board, giving a warning through an operation displaying unit, and executing a copying inhibition control when a copying-inhibited document signal or a copying-inhibited document not-detected signal is inputted during a period other than that for reading a copied document.

In an image forming apparatus according to the present invention, whether discrimination of copying-inhibited documents should be executed or not can be specified through the operation displaying unit, and if it is specified that discrimination of copying-inhibited documents should not be executed, an operation for discrimination by the copying inhibition discriminator is inhibited, so that an operator who copies a general document having a similar pattern to a copying-inhibited pattern (namely a document which may easily be mis-recognized) or an operator who is permitted to prepare a copy of a copying-inhibited document can be carried out according to the necessity.

Also an image forming apparatus according to the present invention detects a hardware error in an copying inhibition discriminating board and gives a warning through the operation displaying unit, and after the copying inhibition control is executed, if an operator specifies through the operation displaying unit that discrimination of copying-inhibited documents should not be executed, the controller cancels the warning and the copying inhibition control to enable copying, so that a copying operation is enabled even when a hardware error in a copying inhibition discriminating board is generated.

In an image forming apparatus according to the present invention, the controller execute communications with the copying inhibition discriminating board for checking connection therewith, and, if the copying inhibition discriminating board is not connected, gives a warning indicating that connection has not been established through the operation displaying unit, and executes the copying inhibition control to disable copying in a state where connection with the copying inhibition discrimination board has not been established.

In an image forming apparatus according to the present invention, when a warning indicating that connection with the copying inhibition discriminating board has not been established is issued, after the copying inhibition control is executed, if an operator specifies that discrimination of copying-inhibited documents should not be executed, the controller cancels the warning indicating that the connection has not been established and the copying inhibition control to enable copying, so that copying can be executed according to the necessity even if communication with the copying inhibition discriminating board has not been established, and an operation for copying general documents is insured until the connection with the copying inhibition discriminating board is restored.

In an image forming apparatus according to the present invention, specification as to whether discrimination of copying-inhibited documents should be executed or not is carried out by entering a code or pressing any hard key, so that specification for discrimination of copying-inhibited documents can not easily be canceled by people other than prespecified operators.

In an image forming apparatus according to the present invention, the control mans and copying-inhibited document discriminator recognize a copying-inhibited document detected signal and a copying-inhibited document not-detected signal according to both a hard signal and a soft signal by means of serial communications or the like, so that a result of discrimination can accurately be recognized without fail.

Other objects and features of this invention will become understood from the following description with reference to the accompanying drawings.

BRIEF DESCRIPTION OF THE DRAWINGS

FIG. 4 is an explanatory view showing an example of a method of detecting a black peak in a black peak detecting section;

FIG. 8 is a flow chart showing operations of the copying-inhibited document discriminating section according to the present invention;

FIG. 9 is a flow chart showing operations for detecting a hardware error in the copying inhibition discriminating board;

FIG. 10 is a flow chart showing a dual check processing according to a hard signal and by a serial communication means;

FIG. 11 is a flow chart showing operations for checking connection with the copying inhibition discriminating board and when communication with the copying inhibition discriminating board has not been established;

DESCRIPTION OF THE PREFERRED EMBODIMENTS

Detailed description is made hereinafter for embodiments in which an image forming apparatus according to the present invention is applied to a digital copying machine with reference to the related drawings.

In this embodiment, a determination is made for each individual pixel data constituting image data in a copying inhibition discriminating board 114 to be described later as to whether the pixel data is a portion of a prespecified copying-inhibited pattern or not, a determination as to whether the image data is a copying-inhibited document or not is made according to a number of pixel data detected as a portion of the copying-inhibited pattern, and a copying-inhibited document detected signal or a copying-inhibited document not-detected signal is outputted depending on a result of the determination. Also when a copying-inhibited document detected signal is inputted during an operation for reading a copied document, a system controller 105 described later determines that the copied document is a copying-inhibited one, executes the copying inhibition control, and when a copying-inhibited document detected signal or a copying-inhibited document not-detected signal is inputted during a period other than that for reading a copied document, the system controller 105 recognizes that a hardware error has occurred in the copying inhibition discriminating board 114, gives a warning through an operation displaying section 104 described later, and executes the copying inhibition control, so that the system controller can accurately discriminate a copying-inhibited document prepared by using paper with a copying-inhibited pattern previously printed or copied on the entire surface, execute the copying inhibition control, detect a hardware error, and execute the copying inhibition control when any hardware error is detected.

Next description is made for a digital copying machine according to the present embodiment in the following order.

① General configuration of a digital copying machine

② Copying-inhibited pattern

③ Copying-inhibited pattern detecting section

④ Copying-inhibited document discriminating section

⑤ Operations for discriminating a copying-inhibited document

Figure 1:
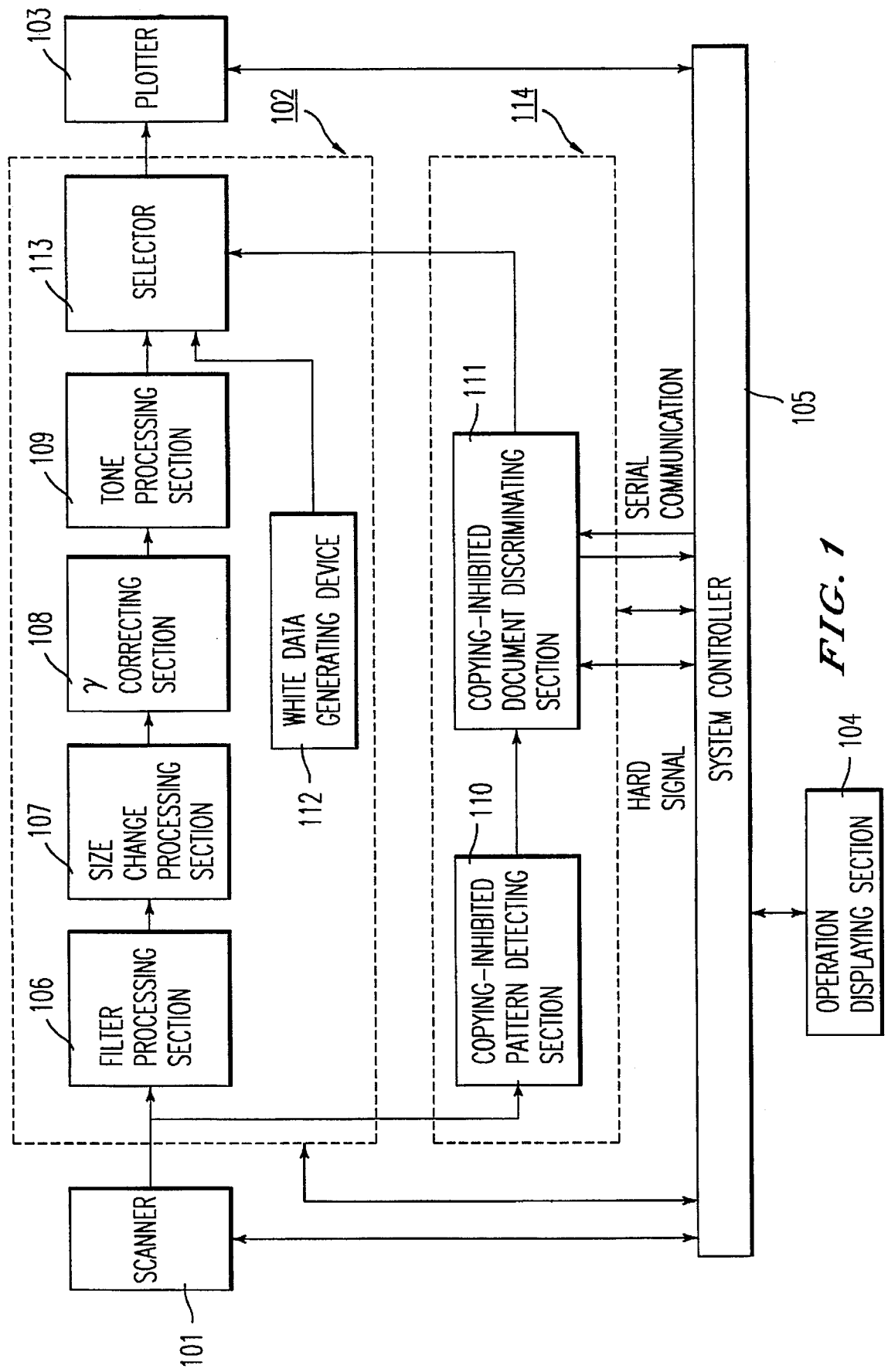
FIG. 1 is a block diagram showing a digital copying machine according to the present invention.

⑥ An operation for detecting a hardware error in the copying inhibition discriminating board ⑦ Dual check processing according to a hard signal and by the serial communication means ⑧ Processing for checking connection with the copying inhibition discriminating board and operations when the connection not established ⑨ Processing for canceling the copying-inhibited state ① General configuration of a digital copying machine FIG. 1 is a block diagram illustrating a digital copying machine according to the present embodiment, comprising a scanner 101 for outputting image data (digital signal) read from a document and subjected to A/D conversion (analog/digital conversion), an image processing section 102 for receiving image data from the scanner 101 and executing various types of image processing described later, a copying inhibition discriminating board 114 for receiving image data from the scanner 101 and making a determination as to whether the image data is that of a copying inhibited document or not, a plotter 103 for outputting the image data subjected to image processing by the image processing section 102 onto recording paper, an operation displaying section 104 for inputting specifications for various types of operating mode and displaying messages or the like, and a system control 105 for controlling each of the sections described above.

It should be noted that the image processing section 102 comprises a filter processing section 106 for executing various types of filter processing to inputted image data with a shading correcting filter, a smoothing filter, an edge emphasizing filter or the like, a size change processing section 107 for changing size of image data, a γ correcting section 108 for executing γ correction, a tone processing section 109 for converting image data to preset multi-valued data, a white data generating device 112 for generating image data consisting of white data, and a selector 113 for receiving image data from both the tone processing section 109 and the white data generating device 112 and selectively outputting either image data inputted from the tone processing section 109 or image data inputted from the white data generating device 112 (namely, white data) according to a result of discrimination by a copying inhibition discriminating section 111 described later to the plotter 103.

The copying inhibition discriminating board 114 comprises a copying-inhibited pattern detecting section 110 for receiving image data from the scanner 101 and making a determination as to whether each individual pixel data constituting image data is a portion of a prespecified copying-inhibited pattern or not, and a copying-inhibited document discriminating section 111 for making a determination as to whether image data is a copying-inhibited one or not according to a number of pixel data each recognized as a copying-inhibited pattern by the copying-inhibited pattern detecting section 110 and outputting either a copying-inhibited document detected signal (described as detected signal hereinafter) or a copying-inhibited document not-detected signal (described as not-detected signal hereinafter) according to a result of discrimination above. It should be noted that the copying inhibition discriminating board 114 is connected to the system controller 105 according to a hard signal to notice it of a detected signal or a not-detected signal as shown in the figure, and by serial communication means comprising optical fiber or the like as shown in the figure.

② Copying-inhibited pattern

Next description is made for a copying-inhibited pattern with reference to FIG. 2. A copying-inhibited pattern is a pattern used for determination as to whether image data (i.e. a document) is a copying-inhibited one or not, and in the present invention, a document in which a copying-inhibited pattern is formed is recognized as a copying-inhibited document. For this reason, a copying-inhibited document is prepared by using paper on which a copying-inhibited pattern has been previously printed or copied on the entire surface. For instance, as shown in FIG. 2 A, a copying-inhibited document can be prepared by recording a document put under security control on paper on which a copying-inhibited pattern 201 has been printed.

Figure 2A:
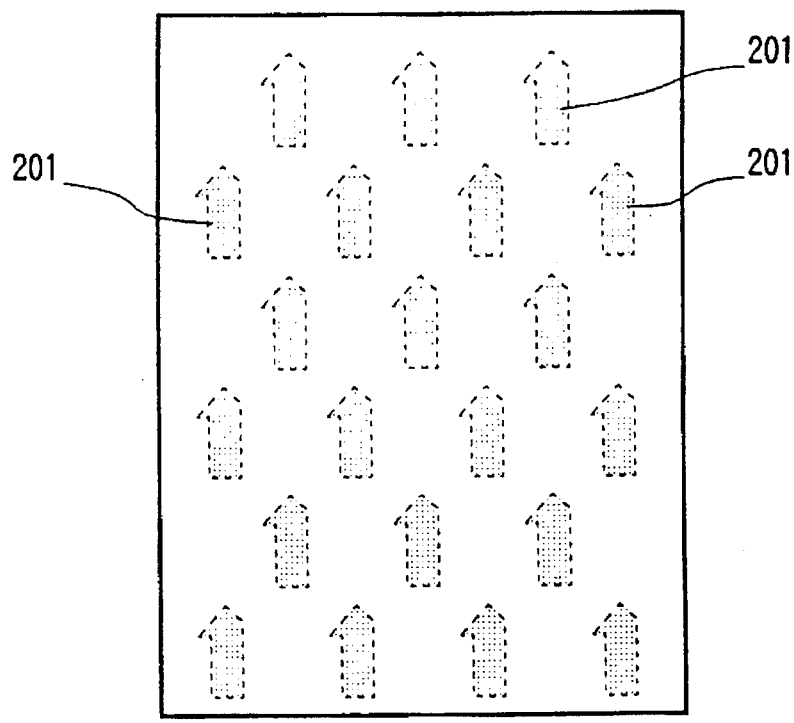
FIG. 2A is an explanatory view showing a pattern inhibited to be copied.
Figure 2B:
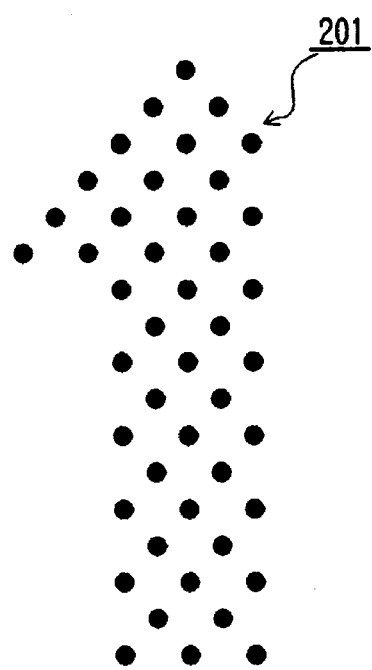
FIG. 2B is an explanatory view showing a pattern inhibited to be copied.

The present embodiment assumes a case where the copying-inhibited pattern 201 was prepared by using a numbering function for data security of a digital copying machine based on the known technology, but the present invention is not always limited to this case. The copying-inhibited pattern 201 prepared by the numbering function for data security is a figure (herein 1) consisting of around 65 dots as shown by the enlarged view in FIG. 2B. A document with copying-inhibited patterns 201 recorded on the entire surface of a sheet of paper as shown in FIG. 2A is recognized as a copying-inhibited document by a device according to the present invention described in detail later, and an operation for inhibiting copying is executed. On the contrary, to other documents, the normal copying operation is executed.

③ Copying-inhibited pattern detecting section

Figure 3:
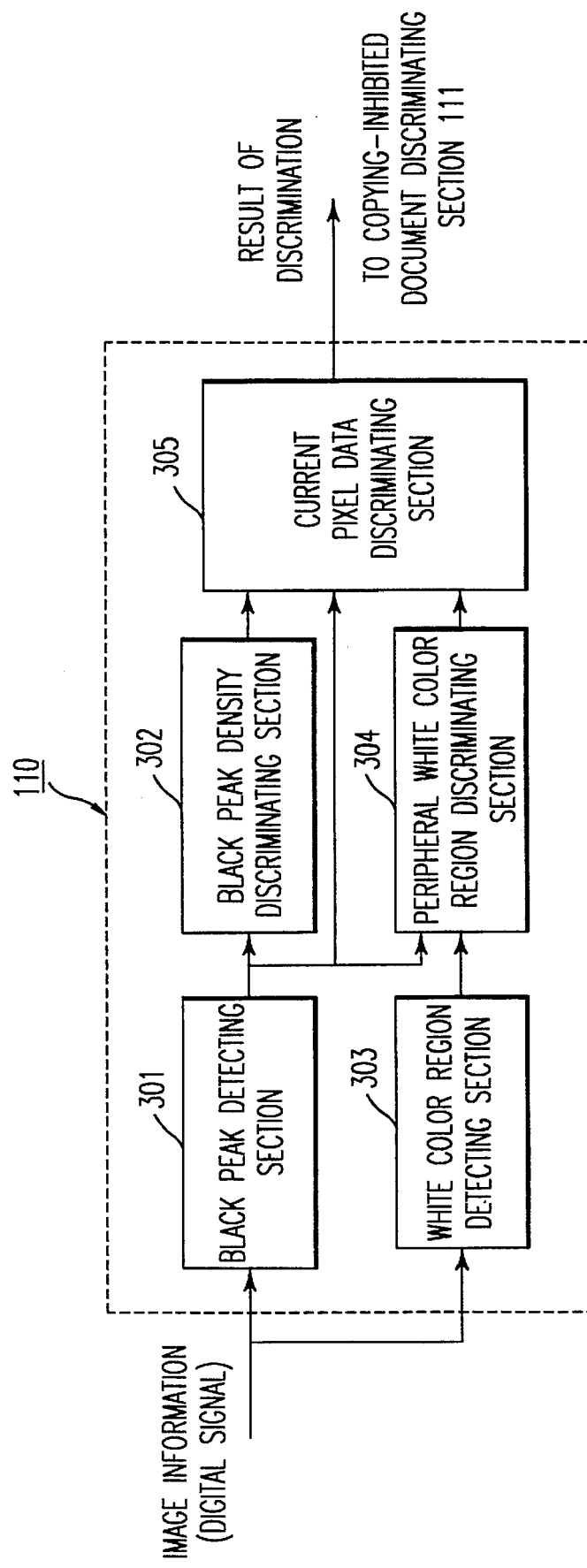
FIG. 3 is a block diagram showing a copying-inhibited pattern detecting section according to the present invention.

FIG. 3 is a block diagram illustrating the copying-inhibited pattern detecting section 110 incorporated in the copying inhibition discriminating board 114, and the copying-inhibited pattern detecting section 110 comprises a black peak detecting section 301 for making a determination for each individual pixel data each constituting image data and according to the current pixel data as well as pixel data adjoining it as to whether the current pixel data is a black peak or not, a black peak density discriminating section 302 for receiving a result of determination by the black peak detecting section 301 and making a determination as to whether a black peak density in a specified area centering on a current pixel data coincides with a black peak density of a prespecified copying-inhibited pattern or not, a white color region detecting section 303 for receiving image data and detecting a white color region, a peripheral white color region discriminating section 304 for receiving a result of detection by the black peak detecting section 301 and a result of detection by the white color region detecting section 303 and making a determination as to whether a white color region having a specified region or more exists in a peripheral area at a distance or more from the current pixel data recognized as a black peak or not, and a current pixel data discriminating section 305 for making a determination as to whether the current pixel data is a portion of a copying-inhibited pattern or not based on result of determination by the black peak density discriminating section 302 and a result of determination by the peripheral white color region discriminating section 304.

Figure 4:
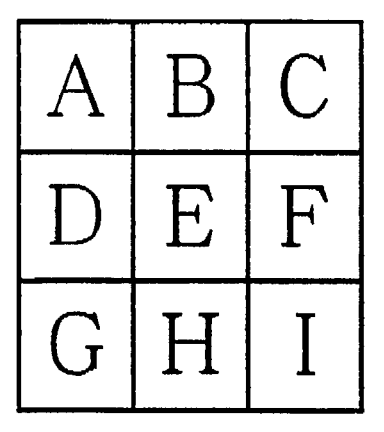

Concretely the black peak detecting section 301 regards current pixel data as a central pixel $\underline{E}$ in a 3×3 matrix as shown in FIG. 4 and detects the current pixel data as a black peak pixel when density of the central pixel $\underline{E}$ is higher than other pixels and also than a specified threshold value (described as a black peak threshold value hereinafter).

The black peak density discriminating section 302 measures a black peak density (for instance, 11×11 matrix) within a specific area centering on current pixel data, and makes a determination as to whether the black peak density corresponds to a peak density corresponding to a shadowed section consisting of around 65 dots specific to the copying-inhibited pattern 201 shown in FIG. 2.

Similarly the while color region detecting section 303 detects presence of a while color region having a specified area or more and makes a determination whether a white color region exists or not. Then detection for a white color region is carried out by converting each pixel in an M×M matrix (for instance, 11×11 matrix) to a binary value according to a specified threshold value (described as a white color detection threshold value hereinafter) and recognizing an area as a white color region when all pixels in the matrix are white.

Figure 5A:
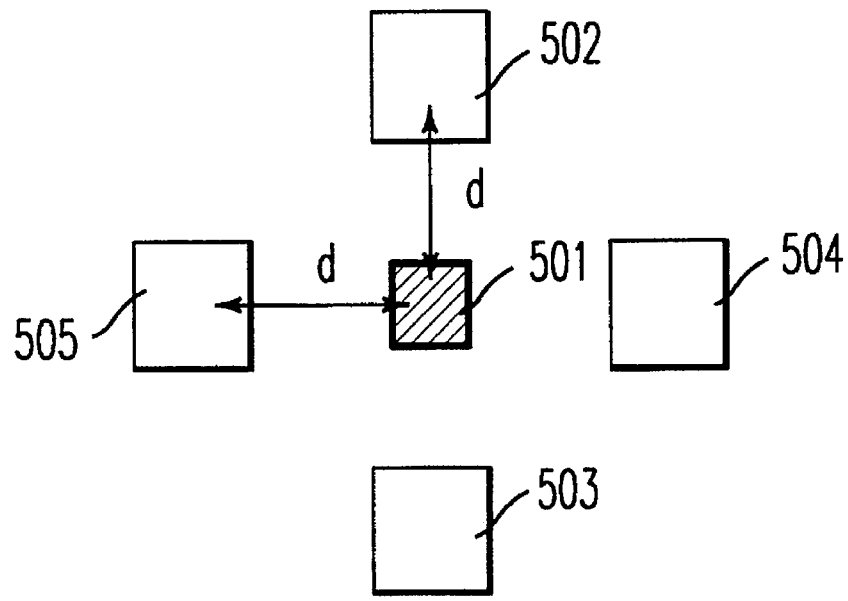
FIG. 5A is an explanatory view showing a method of discriminating a blank area by a peripheral blank area discriminating section.
Figure 5B:
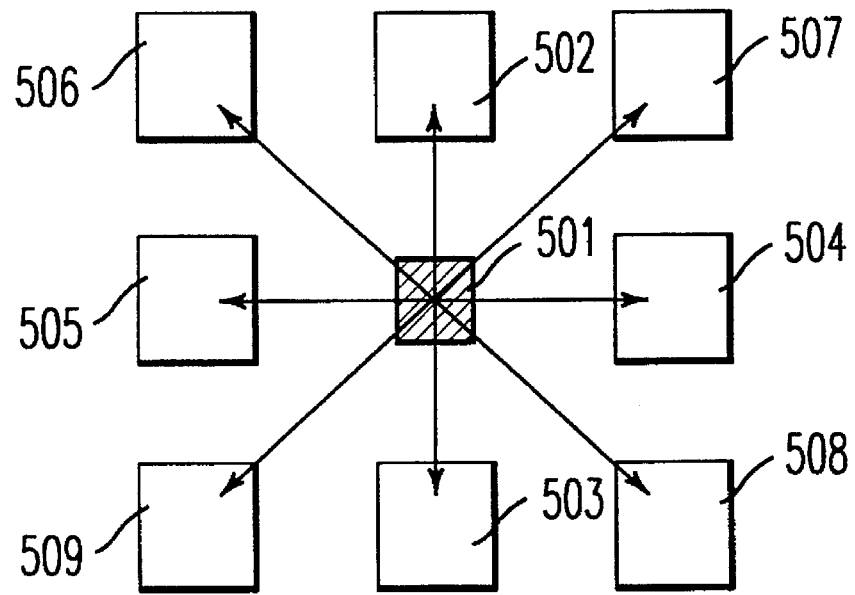
FIG. 5B is an explanatory view showing a method of discriminating a blank area by a peripheral blank area discriminating section.

Furthermore, in the peripheral white color area discriminating section 304, presence of a white region in an area at a distance or more from a pixel detected as a black peak pixel is checked depending on a result of detection by the white color region detecting section 303 and a result of detection by the black peak detecting section 301. For instance, if white color regions exist at regions 502, 503, 504, 505 at a specified distance up, down, right and left from a current pixel 501 as shown in FIG. 5A, the current pixel 501 is recognized as a pixel having a peripheral white color region around it. Herein a determination as to whether a white color region exists or not is made by checking the regions 502, 503, 504, and 505 in four directions of up, down, right and left, but regions 502 to 509 in eight directions of up, down, right, left, obliquely up left, obliquely up right, obliquely right down, and obliquely left down may be checked as shown in FIG. 5B for improving the precision in checking a peripheral white color area. Furthermore, in FIG. 5A, the configuration may be simplified by reducing hardware by means of checking only at regions 502, 503 in two directions of up and down.

Finally the current pixel data discriminating section 305 recognizes a current pixel data as pixel of a copying-inhibited pattern when a black peak pixel (current pixel) has a black peak density specific to a copying-inhibited pattern and a white color region exists at a region at a distance from the current pixel based on results by the black peak density discriminating section 302 and by the peripheral white color region discriminating section 304, and outputs a result of discrimination of a copying-inhibited pattern.

④ Copying-inhibited document discriminating section

Figure 6:
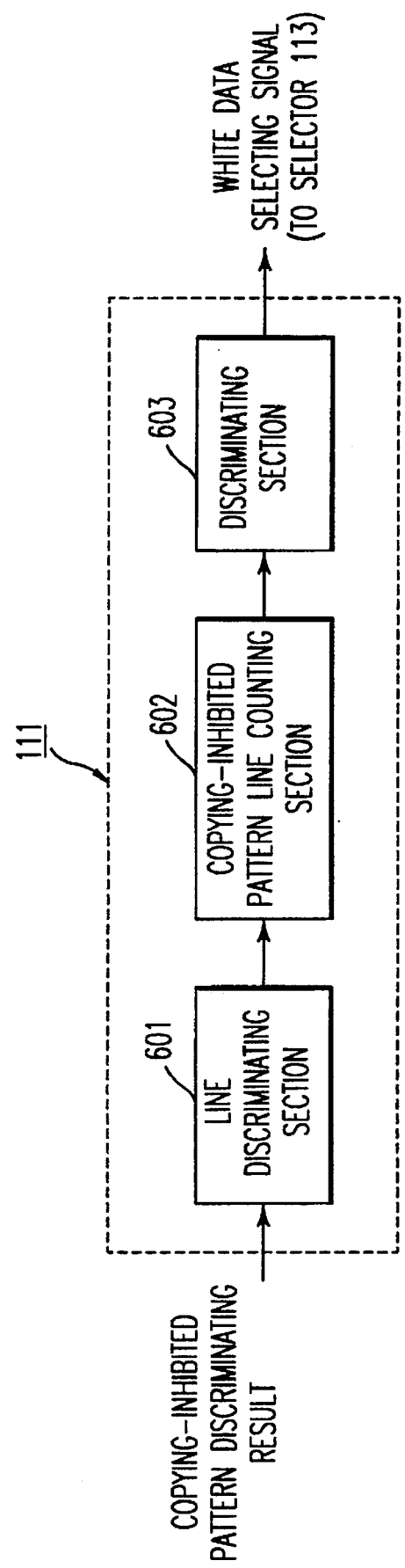
FIG. 6 is a block diagram showing a copying-inhibited document discriminating section according to the present invention.

FIG. 6 is a block diagram illustrating the copying-inhibited document discriminating section 111 incorporated in the copying inhibition discriminating board 114, and the copying-inhibited document discriminating section 111 comprises a line discriminating section 601 for receiving a result of discrimination for a copying-inhibited pattern for each pixel data from the current pixel data discriminating section 305 in the copying-inhibited pattern detecting section 110, counting a number of pixel data recognized as a portion of a copying-inhibited pattern present in one line in the main scanning direction, and discriminating the line as a copying-inhibited pattern line if the count is not less than a first threshold value TH1 specified previously, a copying-inhibited pattern line counting section 602 for maintaining a result for discrimination by the line discriminating section 601 by $\underline{N}$ lines and counting a number of copying-inhibited pattern lines (count $\underline{M}$) among the $\underline{N}$ lines, and a discriminating section 603 for recognizing image data as that of a copying-inhibited document if the count $\underline{M}$ provided by the copying-inhibited pattern line counting section 602 (M<=N) is not less than a second threshold value TH2 specified previously and outputting a detected signal "1". It should be noted that, if image data is not a copying-inhibited document, the discriminating section 603 outputs a not-detected signal "0".

⑤ Operations for discriminating copying-inhibited documents

With the configuration, next detailed description is made for operations for discriminating copying-inhibited documents by the copying inhibition discriminating board 114 with reference to the flow charts in FIG. 7 and FIG. 8.

When a user sets a document to be copied at a specified position in the scanner 101 and depresses the COPY START key (not shown herein) in the operation displaying section 104, image data of the document is read by the scanner 101, which is subjected to A/D conversion and inputted as a digital signal to the image processing section 102 and the copying-inhibited discriminating board 114.

The image processing section 102 inputs image data as a digital signal to the filter processing section 106. The image data inputted into the filter processing section 106 undergoes image processing by the filter processing section 106, size change processing section 107, γ correction section 108, and tone processing section 109 respectively and then transferred to the selector 113.

On the other hand, in the copying-inhibited pattern detecting section 110, a determination is made as to whether each pixel data constituting image data inputted to the copying inhibition discriminating board 114 is a portion of a pre-specified copying-inhibited pattern or not.

Figures 7A, 7B:
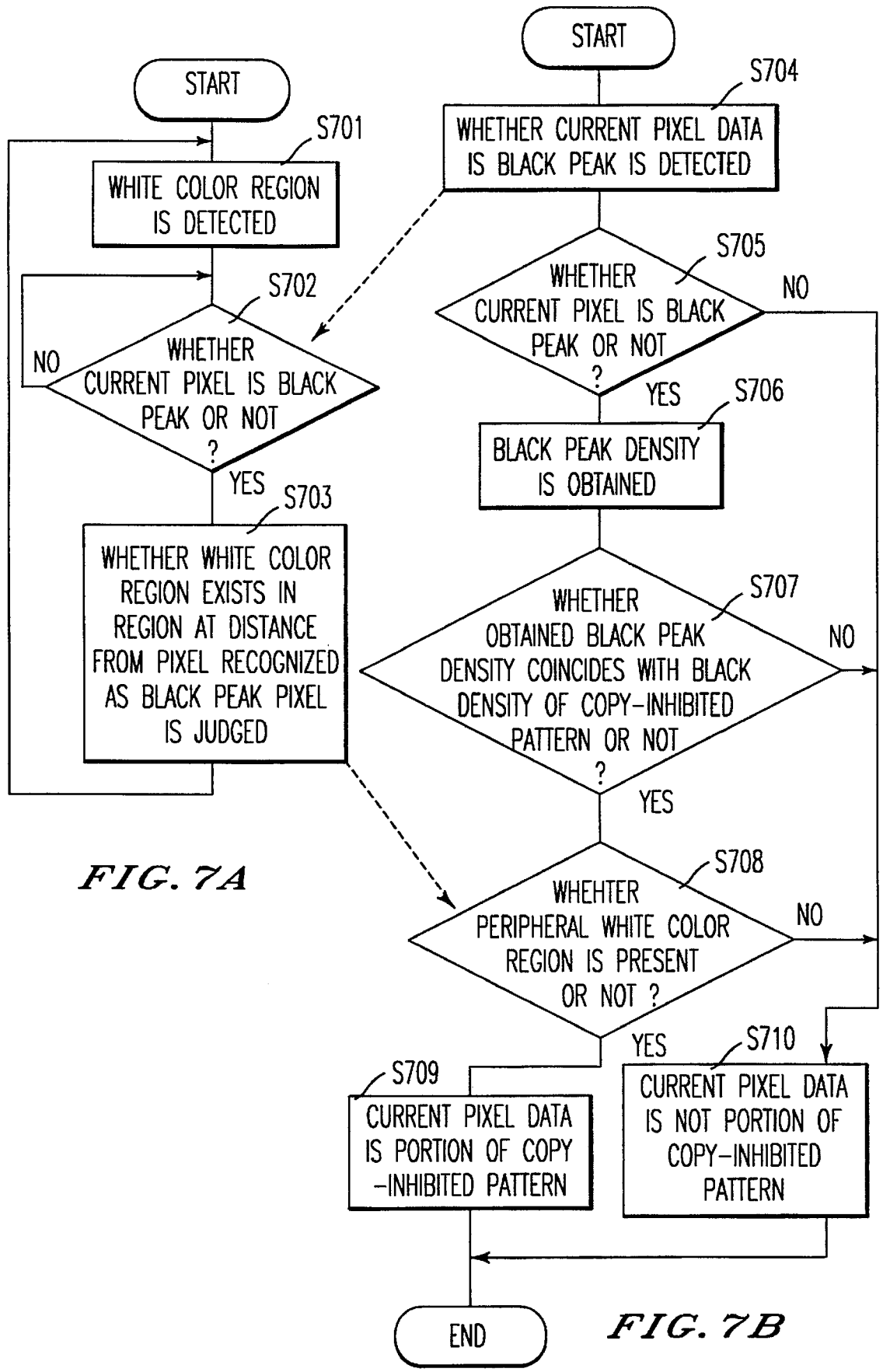
FIG. 7A is a flow chart showing operations of the copying-inhibited pattern detecting section according to the present invention.
FIG. 7B is a flow chart showing operations of the copying-inhibited pattern detecting section according to the present invention.

FIG. 7 is a flow chart illustrating operations of the copying-inhibited pattern detecting section 110, and FIG. 7A is a flow chart for operations of the white region detecting section 303 as well as of the peripheral white color region discriminating section 304, while FIG. 7B is a flow chart of operations of the black peak detecting section 301, black peak density discriminating section 302, and current pixel data discriminating section 305, and operations in these two flow charts are simultaneously executed by means of parallel processing.

As shown by the flow chart in FIG. 7A, at first, the white color region detecting section 303 checks presence of a white color region within a specified area, and makes a determination as to whether a white color region exists or not (S701). Then the peripheral white color region discriminating section 304 receives a result of detection by the black peak detecting section 301, checks whether a current pixel is a black peak or not (S702), makes a determination as to whether a white color region exists in a region at a distance from a pixel recognized as a black peak pixel by the white region detecting section 303 if the current pixel is a black peak, and outputs a result of discrimination to the current pixel data discriminating section 305 (S703). On the other hand, if the current pixel is not a black peak, processing to the current pixel data is terminated, and system control returns to step S701.

As shown by the flow chart in FIG. 7B, at first the black peak detecting section 301 makes a determination as to whether a current pixel data is a black data or not (A704, S705), and if the current pixel data is not a black peak, the current pixel data discriminating section 305 determines that the current pixel data is not a portion of a copying-inhibited pattern (S710).

On the other hand, if the current pixel data is a black peak, the black peak density discriminating section 302 obtains the black peak density (S706), and makes a determination as to whether the obtained black peak density coincides with a black peak density of a copying-inhibited pattern or not (S707). Herein, if the obtained black peak density does not coincide with that of the copying-inhibited pattern, the current pixel data discriminating section 305 determines that the current pixel data is not a portion of the copying-inhibited pattern (S710). If the obtained black peak density coincides with that of the copying-inhibited pattern, whether a peripheral white color region is present or not is checked according to a result of discrimination by the peripheral white color region discriminating section 304 (S708), and if a peripheral white color region is present, a message indicating that the current pixel data is a portion of a copying-inhibited pattern is outputted as a result of discrimination of a copying-inhibited pattern, thus the processing being terminated (S709). On the contrary, if there is not a peripheral white color region, the current pixel data discriminating section 305 determines that the current pixel data is not a portion of the copying-inhibited pattern (S710).

It should be noted that each of the steps S701 to S710 is executed for each pixel data constituting image data and finally to the entire inputted image data.

FIG. 8 is a flow chart illustrating operations of the copying-inhibited document discriminating section 111. At first a result of discrimination of a copying-inhibited pattern for each pixel data is inputted into the line discriminating section 601, and a number of pixel data each recognized as a portion of a copying-inhibited present in one line in the main scanning direction is counted (S801). Then, the count is compared to the first threshold value TH1 (S802), and the line is discriminated as a copying-inhibited pattern line if the count is not less than TH1 (S803), and the line is recognized as a general line which is not a copying-inhibited pattern line if the count is less than TH1 (S804).

Then, the copying-inhibited pattern line counting section 602 maintains a result of discrimination by the line discriminating section 601 by $\underline{N}$ lines, and counts a number of copying-inhibited pattern lines (count $\underline{M}$)in the $\underline{N}$ lines (S805). Then the count $\underline{M}$ is compared to the second threshold value TH2 (S806), and the image data is recognized as a copying-inhibited document if the count $\underline{M}$ is not less than TH2 and the detected signal "1" is outputted (S807). On the other hand, if the count $\underline{M}$ is less than TH2, the not-detected signal "0" is outputted (S808), and the processing is terminated.

As described above, transferred to the selector 113 is a image data from both the tone processing section 109 and the white data generating section 112. According to a result of discrimination by the copying-inhibited document discriminating section 111 (detected signal and not-detected signal), the selector 113 selectively outputs white data inputted from the white data generating device 112 to the plotter 103 in case of the detected signal "1", and also selectively outputs image data inputted from the tone processing section 109 to the plotter 103 in case of the not-detected signal "0".

For this reason, when a copying-inhibited pattern is detected and the document is discriminated as a copying-inhibited one through the processing described above, the image data is replaced by white data, so that the image data, which is a copying-inhibited document, is not outputted to the plotter 103, in other words, copying of image data which is a copying-inhibited document is inhibited by the selector 113.

In the present embodiment, as described above, when a black peak pixel (current pixel) is a black peak density specified to a copying-inhibited pattern and at the same time a white color region exists in a region at a distance therefrom, the current pixel data is discriminated as a pixel of a copying-inhibited pattern, so that presence of a copying-inhibited pattern can easily be detected with high reliability.

Also a determination as to whether a current line is a copying-inhibited pattern line or not is executed for each line, and a document is discriminated as a copying-inhibited document when a number $\underline{M}$ of copying-inhibited pattern line among $\underline{N}$ lines exceeds a specified value, so that copying-inhibited documents can be discriminated without any error.

Also a determination as to whether a line is a copying-inhibited pattern line or not is executed for each line, and when a number $\underline{M}$ of copying-inhibited pattern line among $\underline{N}$ lines exceeds a specified value, a document is discriminated as a copying-inhibited document, and a portion discriminated as a copying-inhibited document can be deleted without fail even from on the way of a page by the white data generating device 112 as well as by the selector 113.

It should be noted that, although the above description of the present invention assumes a case where the image forming apparatus according to the present invention is applied to a digital copying machine, the present invention is not limited to this configuration, and when the image forming apparatus according to the present invention is applied to a facsimile device, facsimile transmission can be inhibited through a similar processing. Also when applied to an image filing device, filing of a copying-inhibited document can be inhibited through a similar processing. Furthermore, when applied to a scanner, reading of a copying-inhibited document can be inhibited through a similar processing.

Also the above description of the present invention assumes a case where image data of a copying-inhibited document is replaced with white data, but the image data may be replaced with black data, or with data having a specified pattern.

(6) Operation for detecting a hardware error in the copying inhibition discriminating board Next description is made for operations for detecting a hardware error in a copying inhibition discriminating board with reference to the flow chart shown in FIG. 9. The system controller 105 at first makes a determination as to whether the copying inhibition discriminating board 114 has been connected thereto or not (S901), and if the connection has not been established, the processing is terminated. It should be noted that, in a case where the connection has not been established, a warning is displayed and copying inhibition is executed in a process described later to check connection of a copying inhibition discriminating board and when connection not established.

On the other hand, when connection has been established, whether a digital copying machine is in a stand-by state or not is checked (S902), and if not in the stand-by state, whether an image is being read by the scanner 101 or not is checked (S903), while, if an image is being read, whether the detected signal has been received or not is checked (S904). Herein, if the detected signal has not been received, control returns to step S903, and receiving of the detected signal in reading an image is waited.

If the detected signal has been received, the document being read by the scanner 101 is a copying-inhibited document, masking of image data after detected is executed to interrupt an operation for copying (S905), end of the operation for copying is waited (S906), a warning indicating that the document is a copying-inhibited one is displayed in a guidance displaying section (not shown) of the operation displaying section 104, the operating state shifts to a copying-inhibited state (S907), and the processing is terminated.

If the digital copying machine is in a stand-by state in step S902, or in a case where an image is not being read by the scanner in step S903, whether the detected signal has not been received or not is checked (S908), control returns to step S902 if not received, it is determined, if received, that a hardware error has occurred in the copying inhibition discriminating board 114, a warning indicating that a hardware error has occurred is displayed with the operating state shifted to the service man call mode (S909), and input of code from the operation displaying section 104 as well as input of a signal from a specified hard key is waited (S910). When code or an input signal from a hard key is inputted, the warning indicating an hardware error is canceled and the processing is terminated (S911).

As described above, the copying-inhibited document detected signal is issued, only when the scanner 101 is working and is reading an image, to the system controller 105, and if a hardware error signal (detected signal) is received by the system controller 105 at a timing other than that, it can be recognized that an error has occurred in the copying inhibition discriminating board 114.

(7) Dual checking according to a hardware signal and by a serial communication means In the present embodiment, as shown in FIG. 1, detection of the detected signal is carried out according to a hardware error signal and by a serial communication means. Concretely, the serial communication means is used to select an operating mode in the system side required for discriminating a copying-inhibited document (such as size changing mode) or to issue a command indicating that a hard signal (detected signal or not-detected signal) is outputted, when the copying inhibition discriminating board 114 has determined that the current document is a copying-inhibited one, to the system controller 105. For this reason, if an operator intentionally sets a hard signal to the not-detected signal, unless the serial communication means does not issue a command, it is determined that a serial communication error has occurred, and copying is inhibited.

FIG. 10 is a flow chart illustrating a dual checking according to a hard signal and by a serial communication means. The system controller 105 at first makes the scanner 101 start its operation (S1001). With this operation, image data is outputted from the scanner 101 to the copying inhibition discriminating board 114, and discrimination of a copying-inhibited document is executed by the copying inhibition discriminating board 114. In this step, if a copying-inhibited document is detected (S1002), a detected command indicating that a copying-inhibited document has been detected is issued by the serial communication means, and then a hard signal (herein the detected signal) is issued.

When the detected command or a hard signal is received (S1003), it indicates that a document currently being read by the scanner 101 is a copying-inhibited document, so that the system controller 105 executes masking of the image data, interrupts the copying operation (S1004), displays a warning indicating that the current document is a copying-inhibited document in a guidance displaying section (not shown) of the operation displaying section (S1004) with the operating state shifted to the copying-inhibited state (S1005), and terminates the processing.

On the other hand, if neither the detected command nor a hard signal is not received (S1003), whether a serial communication error has occurred or not is checked (S1006), and if the error has not occurred, the processing is terminated, while, if the error has occurred, masking of the image data is executed, the copying operation is interrupted (S1007), a warning indicating that a communication error has occurred is displayed in a guidance displaying section (not shown) of the operation displaying section 104 with the operating state shifted to the service man call mode (S1008), and the processing is terminated.

(8) Checking for connection of the copying inhibition discriminating board and processing when the communication has not been established Next description is made for an operation for checking connection of the copying inhibition discriminating board and a processing when the connection has not been established with reference to the flow chart shown in FIG. 11. When main power supply for a digital copying machine is turned ON, power is supplied to a CPU of the copying-inhibited discriminating board 114 and that of the system controller 105 respectively, so that each of the CPUs is started up. Each CPU at first executes hard reset (S1101, S1102), and in this step each CPU recognizes connection of each other through the serial communication means (herein, recognition of the connection is executed by issuing a break signal).

Then, when the break signal is detected, each CPU issues a sync command, and starts operation of a program installed therein (S1103, S1104, S1105, S1106).

On the other hand, if the connection can not be confirmed, namely when the break signal is not detected, the CPU of the system controller 105 starts a timer, waits elapse of a specified period of time (S1107), and if the break signal is not detected during the period, the program is started (S1108), a warning indicating that the copying inhibition discriminating board 114 has not been connected is displayed, when the stand-by state is effected (S1109), in the guidance displaying section (S1110) with the operating state shifted to the copying-inhibited sate (S1111), and the processing is terminated.

It should be noted that in this copying-inhibited state, the system controller 105 waits input of code from the operation displaying section 104 or hard key input.

(9) Operations for canceling the copying-inhibited state

Figure 12B:
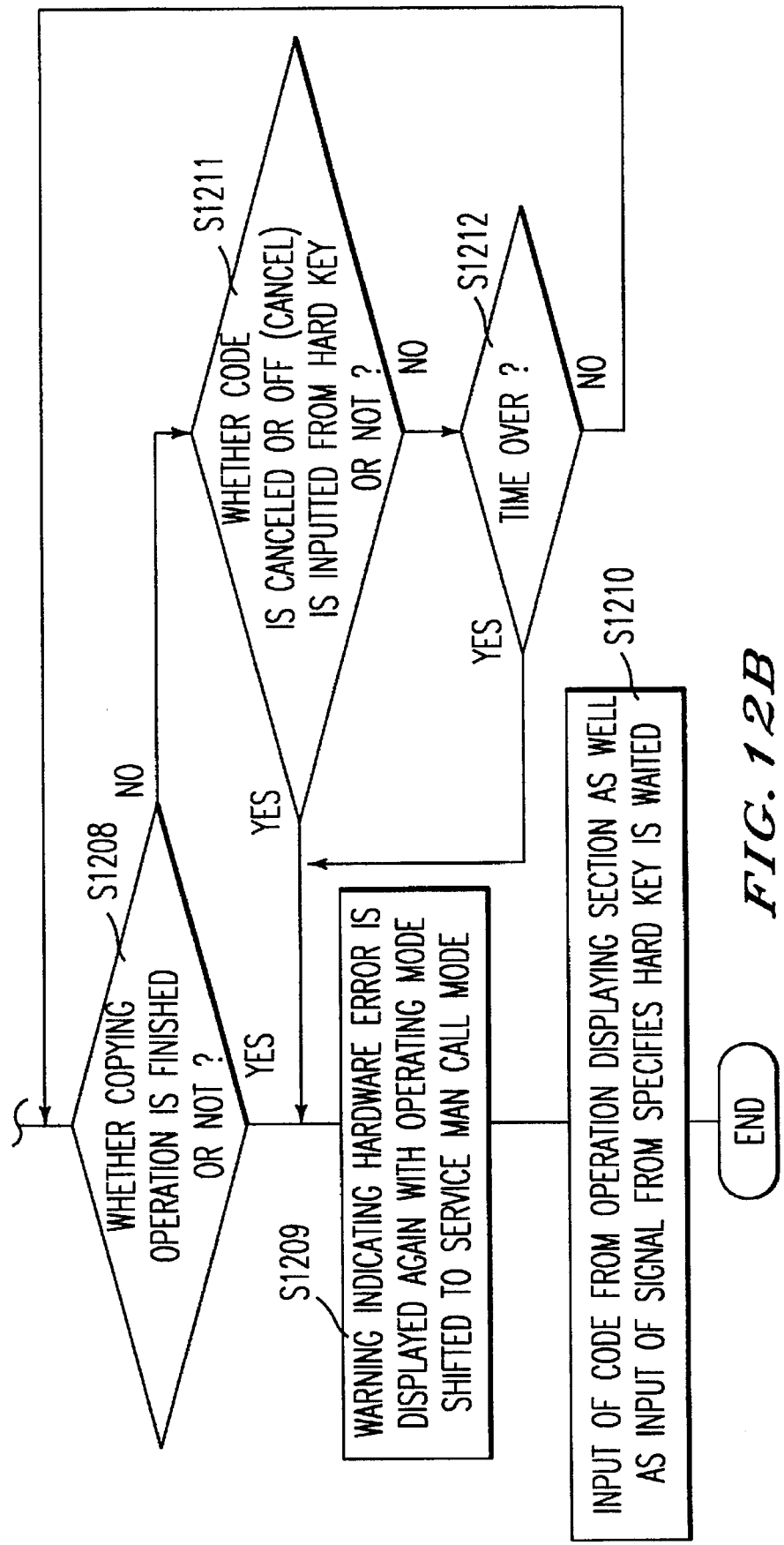
FIG. 12 is a flow chart showing operations for canceling copying-inhibited a hardware error is occurred in the copying inhibition discriminating board.
Figure 13A:
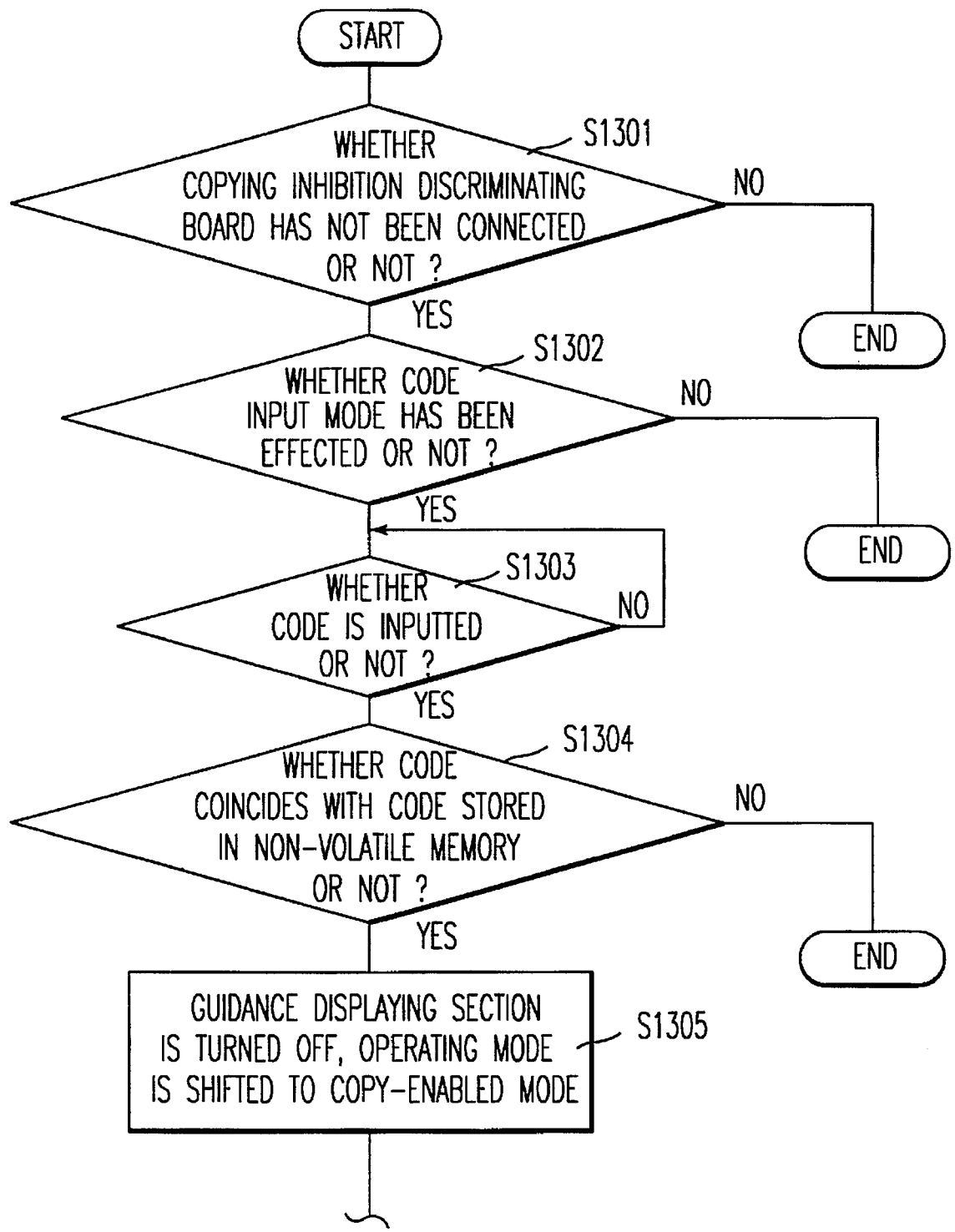
FIG. 13 is a flow chart showing operations for canceling when communication with the copying inhibition discriminating board has not been established.
Figure 13B:
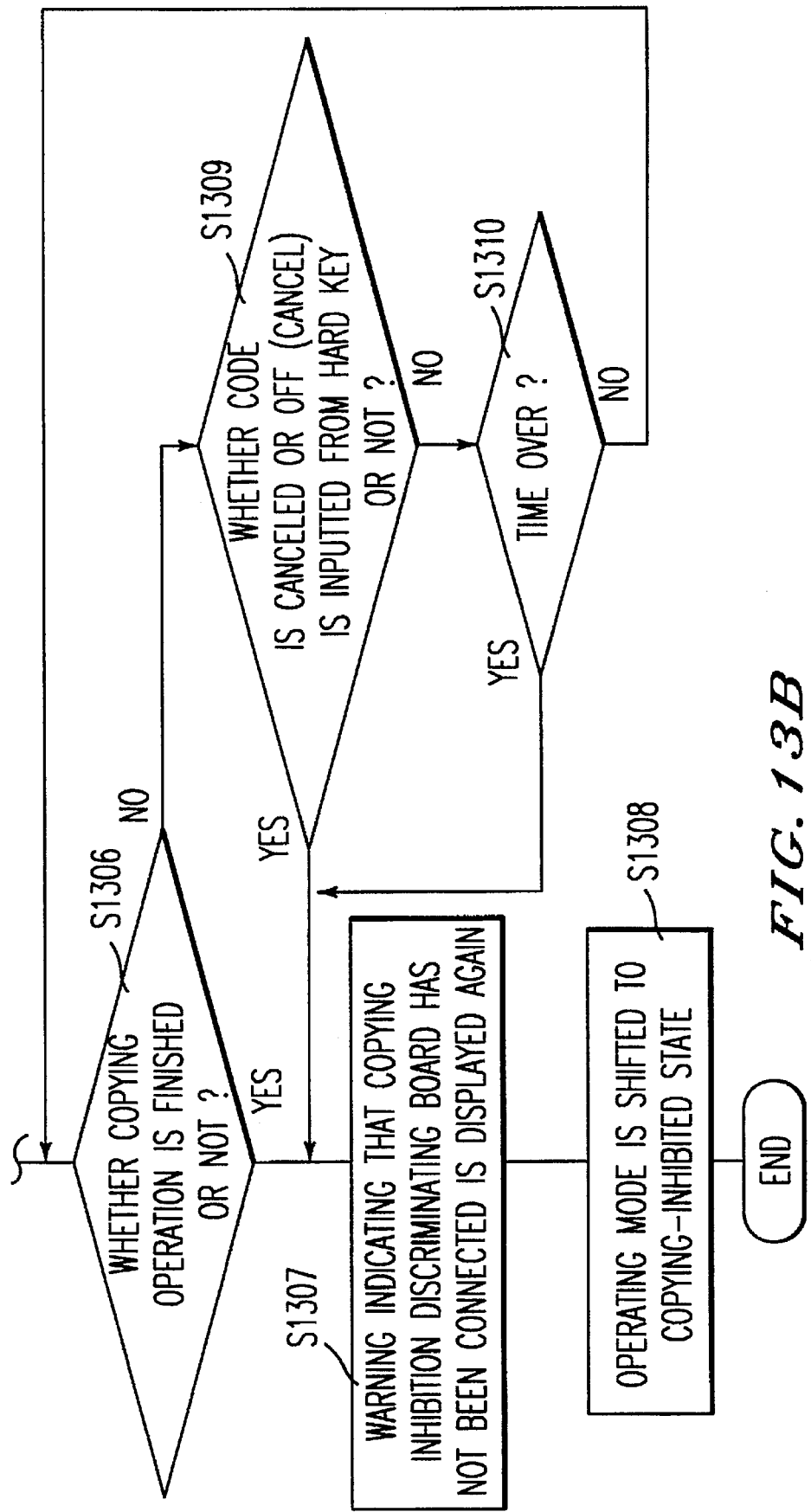
Figure 14B:
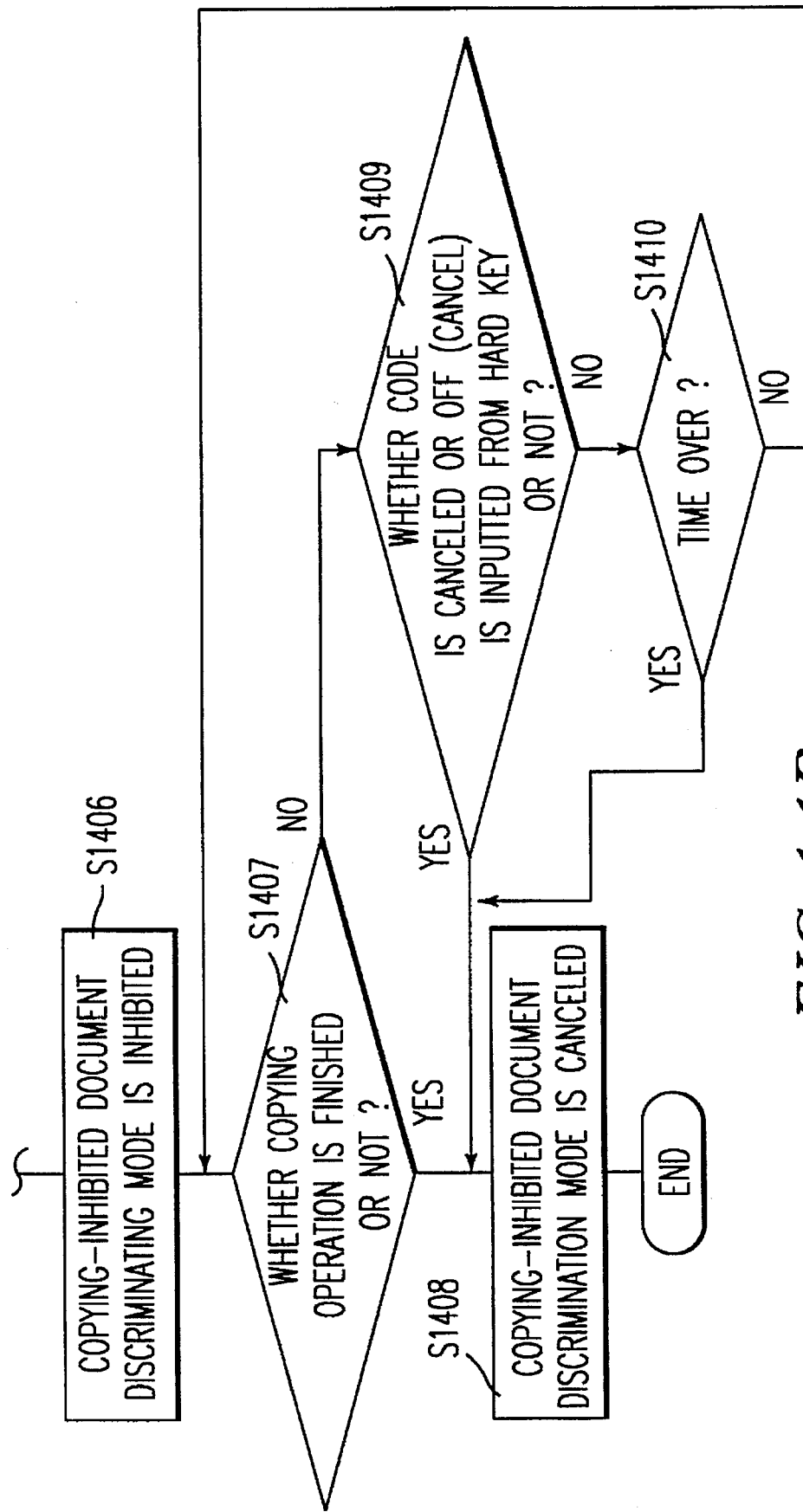
FIG. 14 is a flow chart showing operations for canceling to enable an operation for copying a general document mis-recognized as a copying-inhibited document.

Next description is made for operations for canceling the copying-inhibited state with reference to the flow charts in FIG. 12, FIG. 13 and FIG. 14. These operations are required to enable a copying operation even when, for instance, a hardware error has occurred in the copying inhibition discriminating board 114 or when the copying inhibition discriminating board 114 has not been connected, and also to enable an operation for copying a general document misrecognized as a copying-inhibited one.

At first, code is previously written in a non-volatile memory (not shown) in the system controller 105. The system controller 105 always checks a state corresponding to key entry and displayed in the operation displaying section 104, executes a sequence for inputting code specified by the operator, compares, only when code is inputted, the code to one previously written, for verification, and if the code coincides with the previously inputted one, and in case where a failure has occurred in the copying inhibition discriminating board 114 or when copying is inhibited because the copying inhibition discriminating board 114 has not been connected, the copying-inhibited state is canceled, and an operation for discrimination by the copying inhibition discriminating board 114 is inhibited (the discriminating operation is canceled) to a general document wrongly recognized as a copying-inhibited document, so that the digital copying machine can be used as an ordinary one.

However, after the canceling operation described above is executed, if the preset conditions for copying are completed, when an operation for canceling the operating mode is executed, or when a copying operation is not executed from a specified time or more after the copying work is interrupted, the original copying-inhibited state is automatically restored. This operation is executed to prevent copying from being executed by a person other than the operator who has specified canceling the operating mode for discriminating copied documents. It should be noted that the above operation can be executed by inputting a signal from a hard key in place of inputting code.

FIG. 12 is a flow chart illustrating operations for canceling the copying-inhibited state when a hardware error h as occurred in the copying inhibition discriminating board 114, and at first time whether a hardware error has occurred in the copying inhibition discriminating board 114 or not is checked (S1201), and the processing is terminated when any hardware error has not occurred, while, if a hardware error has occurred, whether another service man call has been issued or not is checked (S1202), and the processing is terminated if another service man call has been issued.

On the other hand, if a hardware has occurred, and when there is not another service man call, whether code input mode has been effected or not is checked (S1203), and if the input mode has been effected, code is inputted (S1204), and whether the code coincides with the code stored in a non-volatile memory in the system controller 105 or not is checked (S1205). If the code does not coincide with the code stored in a non-volatile memory in the system controller 105, the processing is terminated.

When the two code coincide with each other, soft reset and initialization are executed (S1206), the operating mode is shifted to a copying stand-by mode (S1207), completion of the copying operation is waited (S1208), a warning indicating a hardware error is displayed again with the operating mode shifted to the service man call mode (S1209), and input of code from the operation displaying section 104 as well as input of a signal from a specified hard key is waited (S1210).

On the other hand, in step S1208, before the copying operation has not been finished, if code is canceled or OFF (cancel) is inputted from a hard key (S1211), or if a specified period of time elapses after input of the code or hard key input and the specified period is over (S1212), control goes S1210, a warning indics S1210, a warning indicating a hardware error displayed with the operating sate shifted to the service man call mode, and input of code from the operation displaying section 104 as well as input of a signal from a specified hard key is waited.

FIG. 13 is a flow chart illustrating operations for canceling the copying-inhibited document discriminating mode when the copying inhibition discriminating board 14 has not been connected, and at first whether the copying inhibition discriminating board 114 has not been connected or not is checked (S1301), the processing is terminated if the connection has been established, whether the operating mode is the code input mode or not is checked if the connection has not been established (S1302), code is inputted if the operating mode is the input mode (S1303), and whether the inputted code coincides with the code stored in a non-volatile memory in the system controller 105 or not is checked (S1304). In this step, if the two code do not coincide with each other, the processing is terminated.

If the two code coincide with each other, the guidance displaying section is turned OFF, the operating mode is shifted to the copying-enabled mode (S1305), completion of the copying operation is waited (S1306), a warning indicating that the copying inhibition discriminating board 114 has not been connected is displayed again (S1307), and the operating mode is shifted to the copying-inhibited state (S1308).

On the other hand, in step S1306, before the copying operation is complete, inputted code is canceled or OFF (cancel) is entered from a hard key (S1309), or when a specified period of time has elapsed after code input or hard key input and the specified period is over (S1310), system control advances to steps S1307, S1308, and a warning indicating that the copying inhibition discriminating board 114 has not been connected is displayed with the operating mode shifted to the copying-inhibited state.

FIG. 14 is a flow chart illustrating operations for canceling the copying-inhibited document discriminating mode to enable an operation for copying a general document wrongly recognized as a copying-inhibited document, and in this operation flow at first whether a hardware error has occurred in the copying inhibition discriminating board 114 or not is checked (S1401), and if it is recognized that a hardware error has occurred, the system control goes to operations shown in the flow chart in FIG. 12. If it is recognized that any hardware error has not occurred, whether the copying inhibition discriminating board 114 has been connected or not is checked (S1402), and if it is recognized that the copying inhibition discriminating board 114 has not been connected, system control goes to operations in the flow chart shown in FIG. 13.

If it is recognized that any hardware error has not occurred and that the connection has been established, whether the operating mode is the code input mode or not is checked (S1403), and if the operating mode is the input mode, code is inputted (S1404) and whether the inputted code coincides with the code stored in the non-volatile memory in the system controller 105 or not is checked (S1405). In this step, if it is recognized that the two code do not coincide with each other, the processing is terminated and the operating mode enters the stand-by mode.

If the two code coincides with each other, an operation for discrimination by the copying inhibition discriminating board 114 (the copying-inhibited document discriminating mode) is inhibited (S1406), completion of the copying operation is waited (S1407), and inhibition of the copying-inhibited document discrimination mode is canceled (S1408).

In step S1407, before completion of the copying operation, if code is canceled or OFF(cancel) is inputted from a hard key (S1409), or when a specified period of time after code input or hard key input has elapsed and the specified period is over (S1410), system control advances to step S1408, and inhibition of the copying-inhibited document discriminating mode is canceled.

As described above, the image forming apparatus according to the present invention comprises a copying-inhibited pattern detecting section for checking for each pixel data constituting image data whether the pixel data is a portion of a predetermined copying-inhibited pattern or not, a copying-inhibited document discriminating section for checking whether the image data is a copying-inhibited one or not and outputting either a copying-inhibited document detected signal or a copying-inhibited document not-detected signal according to a number of pixel data recognized as a portion of a copying-inhibited pattern by the copying-inhibited pattern detecting section, a copying inhibition discriminating board in which the copying-inhibited pattern detecting section and the copying-inhibited document discriminating section are incorporated, an operation displaying section for various types of key entry as well as for various types of displays, and a controller for recognizing, when a copying-inhibited document detected signal is inputted from the copying-inhibited document discriminating section during reading a copied document, the copied document as a copying-inhibited document and executing copying inhibition control and also for judging, when a copying-inhibited document detected signal or a copying-inhibited document not-detected signal is inputted at a timing other than that during document read, that a hardware error has occurred in the copying inhibition discriminating board, issuing a warning through the operation displaying section and executing the copying inhibition control, so that it is possible to prevent image data of a copying-inhibited document from being copied, transferred, stored, and inputted without fail by accurately discriminating copying-inhibited documents, and also a normal operation for copying can be executed even when an error has occurred in a mechanism for discriminating image data.

In the image forming apparatus according to the present invention, whether discrimination of a copying-inhibited document by the copying inhibition discriminating section should be executed or not can be specified with the operation displaying section, and when it has been specified that discrimination of copying-inhibited documents by the operation displaying section should not be executed, the controller inhibits the discriminating operation by the copying inhibition discriminating section, so that it is possible to prevent image data of a copying-inhibited document from being copied, transferred, stored, and inputted without fail by accurately executing discrimination of a copying-inhibited document and to enable the normal copying operation even if an error has occurred in a mechanism for discriminating image data, and furthermore an operator who copies a general document having a pattern similar to a copying-inhibited pattern (namely a document which may easily be misrecognized), or an operator who is permitted to prepare a copy of a copying-inhibited document can prepare a copy or copies of desired documents according to the necessity.

In the image forming apparatus according to the present invention, whether discrimination of copying-inhibited document by the copying inhibition discriminating section should be executed or not can be specified with the operation displaying section, the controller detects a hardware error in the copying inhibition discriminating board, a warning is issued through the operation displaying section, and when it is specified through the operation displaying section, after copying inhibition control is executed, that discrimination of copying-inhibited documents should not be executed, the warning and copying inhibition control are canceled to enable copying, so that it is possible to prevent image data of a copying-inhibited document from being copied, transferred, stored, and inputted without fail by accurately discriminating copying-inhibited documents and also it is possible to execute the normal copying operation even if an error has occurred in a mechanism for discriminating image data.

In the image forming apparatus according to the present invention, the controller executes communication for checking connection with the copying inhibition discriminating board, issues through the operation displaying section a warning that the connection has not been established when the copying-inhibition discriminating board has not been connected and executes the copying inhibition control, so that it is possible to prevent image data of a copying-inhibited document from being copied, transferred, stored, and inputted without fail by accurately executing discrimination of copying-inhibited documents, the normal copying operation can be executed even if an error has occurred in a mechanism for discriminating image data, and furthermore copying is disabled when the copying inhibition discriminating board has not been connected.

In the image forming apparatus according to the present invention, the controller issues a warning indicating that the copying inhibition discriminating board has not been connected through the operation displaying section, and after the copying inhibition control is executed, if it is specified through the operation displaying section that discrimination of copying-inhibited documents should not be executed, the warning indicating that the connection has not been established and the copying inhibition control are canceled to enable copying, so that it is possible to prevent image data of a copying-inhibited document from being copied, transferred, stored, and inputted without fail by accurately discriminating copying-inhibited documents, the normal copying operation can be executed even if an error has occurred in a mechanism for discriminating image data, and furthermore copying can be executed according to the necessity even if the copying inhibition discriminating board has not been connected, and an operation for copying general documents can be insured until the connection is established.

In the image forming apparatus according to the present invention, specification as to whether discrimination of copying-inhibited documents through the operation displaying section should be executed or not is carried out by inputting code or by means of hard key entry, so that the copying-inhibited document discriminating mode can not easily be canceled by any person other than a specified operator and it is possible to prevent a copying-inhibited document from being copied without fail.

In the image forming apparatus according to the present invention, the controller and copying-inhibited document discriminating section recognize the copying-inhibited document detected signal and copying-inhibited document not-detected signal according to both a hard signal and a soft signal by means of serial communication or the like, so that a result of discrimination can accurately be recognized, and also as a result of discrimination is recognized according to both a hard signal and a soft signal, it is possible to furthermore accurately prevent copying-inhibited documents from being copied.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus comprising:

a copying-inhibited pattern detector for detecting for each pixel data constituting image data whether said pixel data is a portion of a predetermined copying-inhibited pattern;

a copying-inhibited document discriminator for discriminating whether said image data is a copying-inhibited one according to a number of pixel data recognized as a portion of a copying-inhibited pattern by said copying-inhibited pattern detector, and outputting either a copying-inhibited document detected signal or a copying-inhibited document not-detected signal;

a copying inhibition discriminating board in which said copying-inhibited pattern detector and said copying-inhibited document discriminator are incorporated;

an operation displaying unit for various types of key entry as well as for various types of displays; and a controller for recognizing, when a copying-inhibited document detected signal is inputted from said copying-inhibited document discriminator during reading of a copied document, said copied document as a copying-inhibited document and executing copying inhibition control, and also for judging, when a copying-inhibited document detected signal or a copying-inhibited document not-detected signal is inputted at a timing other than that during document read, that a hardware error has occurred in said copying inhibition discriminating board, issuing a warning through said operation displaying unit and executing said copying inhibition control.

2. An image forming apparatus according to claim 1, wherein a setting as to whether discrimination of copying-inhibited documents through said operation displaying unit should be executed is carried out by inputting a code or by means of hard key entry.

3. An image forming apparatus according to claim 1, wherein said operation displaying unit can specify whether discrimination of a copying-inhibited document by said copying inhibition discriminator should be executed, and when it has been specified that discrimination of copying-inhibited documents by said operation displaying unit should not be executed, said controller inhibits said discriminating operation by said copying inhibition discriminator.

4. An image forming apparatus according to claim 3, wherein a setting as to whether discrimination of copying-inhibited documents through said operation displaying unit should be executed is carried out by inputting a code or by means of hard key entry.

5. An image forming apparatus according to claim 1, wherein said operation displaying unit can specify discrimination of a copying-inhibited document by said copying inhibition discriminator should not be executed, and cancel said warning and copying inhibition control to enable copying.

6. An image forming apparatus according to claim 5, wherein a setting as to whether discrimination of copying-inhibited documents through said operation displaying unit should be executed is carried out by inputting a code or by means of hard key entry.

7. An image forming apparatus according to claim 1, wherein said controller executes communication for checking connection with said copying inhibition discriminating board, issues through said operation displaying unit a warning that said connection has not been established when said copying-inhibition discriminating board has not been connected and executes said copying inhibition control.

8. An image forming apparatus according to claim 7, wherein a setting as to whether discrimination of copying-inhibited documents through said operation displaying unit should be executed is carried out by inputting a code or by means of hard key entry.

9. An image forming apparatus according to claim 7, wherein said controller issues a warning indicating that said copying inhibition discriminating board has not been connected through said operation displaying unit, and after said copying inhibition control is executed, if it is specified through said operation displaying unit that discrimination of copying-inhibited documents should not be executed, said warning indicating that said connection has not been established and said copying inhibition control are canceled to enable copying.

10. An image forming apparatus according to claim 9, wherein a setting as to whether discrimination of copying-inhibited documents through said operation displaying unit should be executed is carried out by inputting a code or by means of hard key entry.

11. An image forming apparatus according to claim 1, wherein said controller and said copying-inhibited document discriminator recognize said copying-inhibited document detected signal and copying-inhibited document not-detected signal according to both a signal and a serial communication, different from the signal.

* * * * *